United States Patent Office 3,372,042
Patented Mar. 5, 1968

3,372,042
HOT TOP AND COMPOSITION THEREOF
John C. Wright, Euclid, Ohio, assignor to Columbiana Incorporated, a corporation of Ohio
No Drawing. Filed June 15, 1965, Ser. No. 464,185
2 Claims. (Cl. 106—38.3)

ABSTRACT OF THE DISCLOSURE

This invention is in a refractory-combustible hot top composition including an organic fibrous material, sodium silicate and a fused lightweight aluminum silicate containing aggregate in which all of the volatile gases have been driven off.

---

In casting ingots, hot metal is poured into a mold through an opening or piping area located in the mold. This opening is surrounded by what is generally known in the trade as a hot top. These hot tops form a cavity or reservoir above the opening in the mold for receiving molten metal at the time the casting is poured. This molten metal in combination with the inherent insulating or heat supplying qualities of the hot top prevent the upper portion of the casting from cooling too quickly. If the upper portion of the casting cools at a much faster rate than the molten metal at the bottom of the mold, a pipe type cavity is formed down through the center portion of the casting. To avoid this, the present practice is to use a hot top as a means of holding the molten metal over the opening of the mold or the piping area while at the same time supplying or preventing heat from escaping from the top of the mold.

The hot tops are usually prepared from a mixture of refractory and combustible materials that form a structure of desired porosity and structural strength to provide an insulating or heat supplying means and means to retain molten metal above the piping area of a mold, as mentioned above. In forming hot tops, however, it has been difficult to obtain elements which together provide desired body strength, insulating and heat supplying qualities for a hot top which is light in weight, but yet of sufficient structural strength to facilitate its manufacture and ultimate handling in use.

Accordingly, it is an object of this invention to provide a composition for preparing hot tops having desired porosity yet of desired structural strength.

It is another object of this invention to provide a hot top composition comprising an organic fibrous material bonded to a lightweight aggregate containing aluminum silicate.

It is a further object of this invention to provide a hot top composition comprising an organic fibrous material and lightweight aggregate containing aluminum silicate coacting in a manner to provide a composition of sufficient structural strength, desired porosity and weight to form an improved hot top.

It is a still further object of this invention to provide a new and novel composition for preparing hot tops comprising essentially rice hulls, sodium silicate and an aluminum silicate containing lightweight aggregate.

These and other objects of the invention will become apparent from a reading of the following further and more detailed description of the invention.

It has been found that improved hot tops can be prepared from a composition consisting essentially of a sintered, bloated clay material, which contains a major portion of aluminum silicate, rice hulls and sodium silicate. More specifically, hot tops of improved porosity, and desired weight and structural strength can be prepared from a composition comprising essentially about 18 to 25 percent by weight rice hulls, about 35 to 40 percent by weight sodium silicate and about 38 to 45 percent by weight aluminum silicate. The sintered, bloated aluminum silicate containing material is readily available commercially in one form well known as Haydite, which is a trade name for a composition, which is essentially complex aluminum silica oxides containing additional small amounts of iron, calcium, magnesium, sulfur and sodium.

In preparing the hot top composition the quantities of the sintered, bloated aluminum silicate containing material, rice hulls, and sodium silicate are mixed, then placed in a mold of desired shape, and dried for a sufficient length of time to drive off the water present in the sodium silicate. This results in a solid, porous, lightweight combustible composition.

U.S. Patent No. 3,109,211 discloses my prior joint invention for a hot top composition using wood dust as the organic fibrous material and calcium magnesium carbonate in combination with a sodium silicate binder. The use of rice hulls in a composition for forming hot tops has advantages over wood dust or wood chips as in prior Patent 3,109,211 in that rice hulls are slower burning, lighter in weight per unit volume, more consistent in chemical make-up and do not contain resins which react with or are sensitive to the sodium silicate binder. The use of Haydite in the place of dolomite, the trade name for calcium magnesium carbonate, as in Patent 3,109,211 in a hot top composition has advantages in that Haydite is much lighter in weight per unit volume facilitating handling, mixing and molding the hot top as well as handling of the hot top in ultimate use. Further, this form of aluminum silicate is coarser than calcium magnesium carbonate so that hot tops made from such aluminum silicate are more porous but yet of sufficient structural strength to provide a hot top with better qualities of insulating or supplying heat to, for example, an ingot. Also, the calcium magnesium carbonate tends to react with a sodium silicate binder requiring the use of a higher grade of binder that is more alkaline. The aluminum silicate is more flexible in that a greater variety of grades of binders can be used in making a hot top composition from this material. A hot top composition comprising rice hulls and aluminum silicate results in a structure that is less hydroscopic; therefore, having a longer shelf life than a composition of wood dust or chips and calcium magnesium carbonate as in Patent 3,109,211. While commercial aluminum silicate,

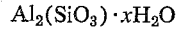

$$Al_2(SiO_3) \cdot xH_2O$$

in its various grades of purity( and preferably sintered and bloated to improve porosity) may be used in lieu of the sintered, bloated lightweight aggregate which is predominantly aluminum silicate, it is more costly, and highly effective results are secured with the preferred clay derivative, Haydite.

The grind of the rice hulls is plus or minus five percent fines with the remainder being cracked hulls which are fairly coarse. The chemical composition of the Haydite in terms of metal oxides is as follows: 63.25 percent silicon oxide; 6.08 percent iron oxide; 22.94 percent aluminum oxide; 0.65 calcium oxide; 1.94 magnesium oxide; .36 sulfur oxide; and, 4.26 sodium oxide. This composition is formed from crushed shale which is dried in a kiln at about 2,200° F. for approximately 45 minutes. This forms a clinker which is a fused, lightweight aluminum silicate-containing aggregate in which all the volatile gases have been driven off. This results in an aluminum silicate which is lighter in weight than the calcium magnesium carbonate disclosed in my prior U.S. Patent 3,109,211. This lightweight aggregate is then crushed to the desired mesh size. In the case of the aluminum silicate used in the composition of this invention the mesh size of the aggregate is the mean of 4 to 100 mesh.

The optimum percentage by weight of the elements of the novel hot top composition of this invention to form a composition that is lightweight and sufficiently porous to perform the functions of either insulating or supplying heat to a casting are as follows: 21.7 percent by weight rice hulls; 37.2 percent by weight sodium silicate; and, 41.0 percent by weight Haydite. This results in a composition for use in hot tops which has excellent high temperature characteristics so that it is a refractory-combustible composition, but not entirely changed in state or chemically broken down when in contact with the molten metal forming the casting.

The rice hulls and sintered, bloated aluminum silicate containing material are so proportioned in the composition and coact through the sodium silicate to provide a composition having desired qualities of supplying heat or insulating a high melting point substance such as steel. These elements of the composition coact to enhance properties of porosity to retain heat transferred thereto and/or supply heat to a casting.

While the above invention has been described with reference to specific examples, it is to be understood that the invention is not intended to be limited to these exact examples except as recited hereinafter in the appended claims.

What is claimed is:

1. A shaped refractory-combustile hot top consisting essentially of about 18 to 25 percent by weight rice hulls, about 35 to 40 percent by weight dehydrated sodium silicate, and about 38 to 40 percent by weight sintered, bloated aluminum silicate containing material having essentially the following analysis in terms of metal oxides: 63.25% silicon oxide; 6.08% iron oxide; 22.94% aluminum oxide; 0.65% carbon oxide; 1.94% magnesium oxide; 0.35% sulfur oxide; and 4.26% sodium oxide.

2. A shaped refractory-combustible hot top consisting essentially of 21.7 percent by weight rice hulls, 37.3 percent by weight dehydrated sodium silicate, and 41.0 percent by weight lightweight aggragate containing aluminum silicate having essentially the following analysis in terms of metal oxides: 63.25% silicon oxide; 6.08% iron oxide; 22.94% aluminum oxide; 0.65% carbon oxide; 1.94% magnesium oxide; 0.36% sulfur oxide; and 4.26% sodium oxide.

References Cited
UNITED STATES PATENTS

| | | | |
|---|---|---|---|
| 3,006,046 | 10/1961 | Shephard et al. | 22—193 |
| 3,103,046 | 9/1963 | La Bate | 249—61 X |
| 3,109,211 | 11/1963 | Wagner et al. | 22—193 |
| 3,212,749 | 10/1965 | La Bate | 106—38.3 X |
| 3,262,165 | 7/1966 | Ingham | 22—193 |

ALEXANDER H. BRODMERKEL, *Primary Examiner.*

L. B. HAYES, *Assistant Examiner.*